March 4, 1924.
W. E. KIDNEY
COFFEE MILL
Filed July 15, 1922
1,485,855
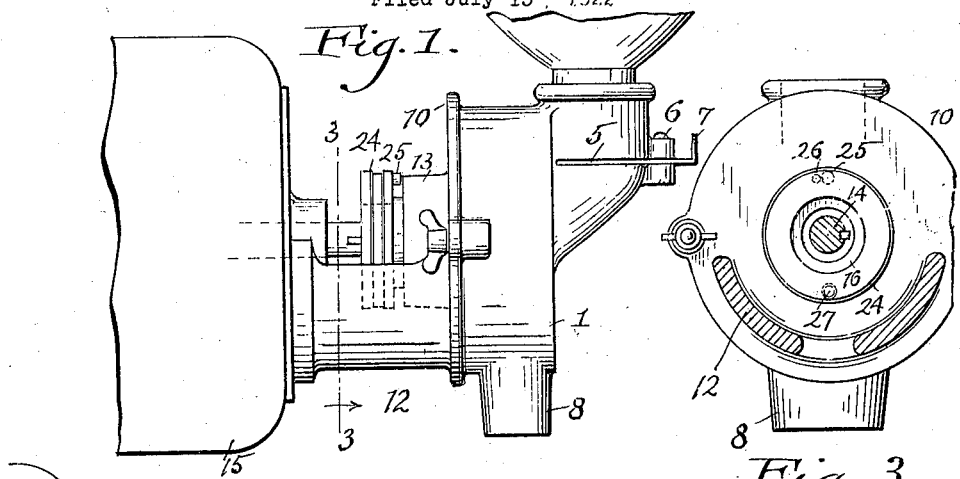
Fig. 1.
Fig. 3.
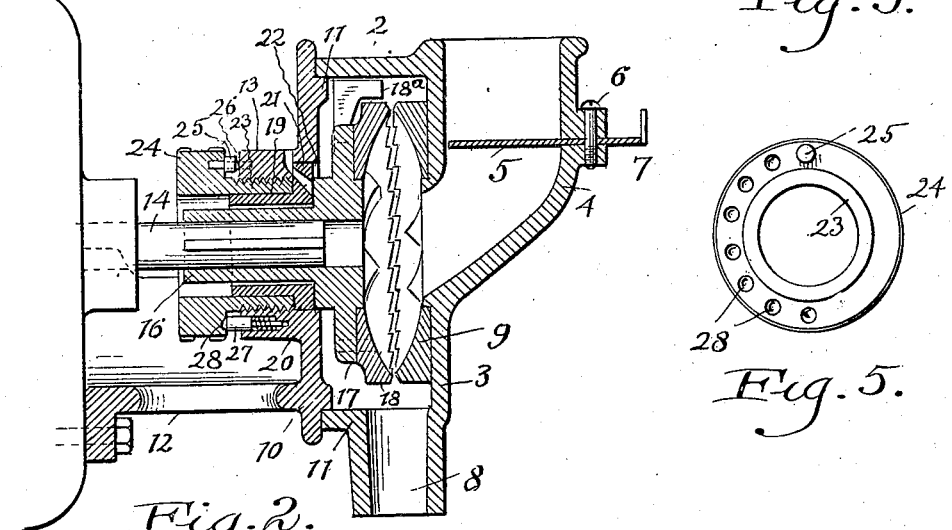
Fig. 2.
Fig. 5.
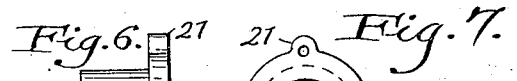
Fig. 6. Fig. 7.
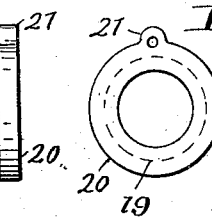
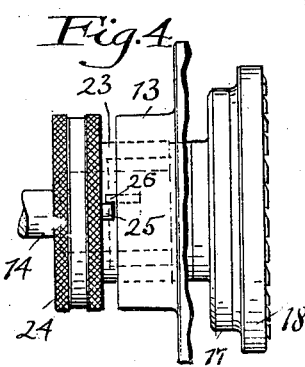
Fig. 4.
Inventor
Willis E. Kidney
by
Thurston Kwis + Hudson Patented Mar. 4, 1924.

1,485,855

UNITED STATES PATENT OFFICE.

WILLIS E. KIDNEY, OF CLEVELAND, OHIO, ASSIGNOR TO THE CLEVELAND ELECTRIC MACHINE AND MANUFACTURING COMPANY, OF CLEVELAND, OHIO, A CORPORATION OF OHIO.

COFFEE MILL.

Application filed July 15, 1922. Serial No. 575,248.

*To all whom it may concern:*

Be it known that I, WILLIS E. KIDNEY, a citizen of the United States, residing at Cleveland, in the county of Cuyahoga and State of Ohio, have invented a certain new and useful Improvement in Coffee Mills, of which the following is a full, clear, and exact description.

This invention relates to coffee mills of the type in which the coffee is ground between the serrated faces of stationary and rotating burr disks and has for its object to provide a machine in which the burrs can be quickly and accurately positioned for grinding the coffee to the desired degree of fineness, and also to provide means for limiting the amount of adjustment so that it is impossible to position the burrs too close together or too far apart for proper grinding.

The following description and the annexed drawings set forth in detail certain means embodying the invention, the disclosed means, however, constituting but one of the various mechanical forms in which the principle of the invention may be employed.

Reference should be had to the accompanying drawings forming a part of this specification in which Fig. 1 is a side elevation of the machine; Fig. 2 is a vertical axial section through the machine; Fig. 3 is a section on line 3—3 Fig. 1; Fig. 4 is a fragmentary view showing the rotary burr and the means for adjusting the same; Fig. 5 is an elevation of the adjusting sleeve and hand wheel detached; Fig. 6 is a side elevation of the intermediate sleeve detached; Fig. 7 is an end view of the sleeve shown in Fig. 6.

Referring to the annexed drawing, it will be seen that the grinding mechanism is housed within a substantially cylindrical casing which is adapted to receive the coffee to be ground from a suitable container supported above the casing and delivers the ground coffee through a discharge outlet at the lower portion of the casing. The casing or housing has a body portion 1 in the form of a casting having a substantially cylindrical wall 2 and a vertical side wall 3. The casting is formed to provide a tubular inlet 4 which delivers into an axial opening in the wall 3. Within the inlet 4 is a pivoted valve 5 which is mounted to swing about a vertical pivot 6 in either direction through a slot provided in the inlet 4 and is provided with an outwardly extending finger piece 7 by means of which it can be moved to and from closed position. The body 1 of the casing is provided with a discharge outlet 8 at the bottom thereof and has a stationary burr 9 which has a central aperture registering with the central inlet opening in the wall 3 and is rigidly secured to the wall 3. On the side opposite the wall 3 the casing or housing is closed by a cover plate 10 which has a circumferential rib 11 upon its inner face which fits within the cylindrical wall 2 and is detachably bolted to the body portion 1 of the housing. A supporting bracket 12 is formed integrally with the lower portion of the cover plate 10, extends rearwardly therefrom, and is adapted to be bolted to a suitable rigid support. The cover plate 10 has a central aperture and a tubular internally threaded boss 13 surrounding the opening and extending rearwardly therefrom. A shaft 14 which is preferably power driven at a high rate of speed and may be the shaft of a motor 15 is disposed axially of the opening in the cover plate 10 and extends into the housing.

Slidably keyed to the shaft 14 is a sleeve 16 which has a peripheral flange 17 at its forward end within the housing to which is rigidly attached the rotary burr 18 which cooperates with the stationary burr 9 carried by the side wall 3. The flange 17 also carries a paddle 18ᵃ which overhangs the outer edge of the burr 18 and serves to feed the ground material to the outlet 8.

Fitting upon the outer reduced end of the sleeve 16 is an intermediate sleeve 19 which has an outwardly extending circumferential flange 20 at its front end in engagement with a shoulder adjacent the rear face of the flange 17 to which the rotary burr 18 is attached. The flange 20 of the intermediate sleeve 19 has a projection 21 which slidably engages a notch 22 in the cover plate 10 at one side of the opening therein.

Fitting upon the intermediate sleeve 19 is an externally threaded adjusting sleeve 23 which is in threaded engagement with the internally threaded boss 13 and engages the rear face of the flange 20 of the intermediate sleeve 19. A handwheel 24 is formed integrally upon the rear end of the adjusting sleeve 23. By rotating the handwheel 24 the flange 20 of the intermediate sleeve 19 can be forced inwardly against the shoulder on the burr carrying sleeve 16.

In the operation of the machine the inner flanged end of the sleeve 16 is forced outwardly against the flange 20 of the intermediate sleeve 19. By adjusting the sleeve 23 inwardly or outwardly, the space between the burrs 9 and 18 can be regulated to grind the coffee to the desired degree of fineness.

It is desirable, however, to provide means to limit the adjustment of the rotary burr with respect to the stationary burr so that the two burrs cannot be crowded too close together or permitted to spread apart sufficiently to be ineffective.

To this end the hand wheel 24 has a rigid lug 25 upon its inner face which engages with a rigid lug 26 upon the outer end of the boss 13 to limit the rotation of the handwheel in one direction, and a spring pressed detent 27 carried by a diametrically opposite portion of the tubular boss 13 is engageable by the lug 25 to limit its movement in the opposite direction.

It is desirable that the adjusting sleeve 23 be firmly held in adjusted position at intermediate points so that it will not be moved by the vibration of the machine when in operation. To this end the inner face of the handwheel 24 is provided with a series of spaced indentations 28 adapted to receive the rounded end of the spring pressed detent 27.

As shown herein, the extent of movement of the handwheel is substantially 180° and the identations 28 are formed in the half of the handwheel which is engaged by the detent in the movement of the handwheel. When the detent 27 is engaged in one of the indentations 28, the sleeve 23 is locked against inadvertent turning movement due to the vibration of the machine.

Having described my invention, I claim:

1. A coffee mill, comprising a burr housing, a stationary burr therein, a drive shaft, a rotary burr slidably keyed to said drive shaft, a flanged sleeve surrounding said shaft, movable longitudinally thereof and engageable with said rotary burr and a second sleeve having a hand wheel thereon, said second sleeve surrounding said first mentioned sleeve, engaging the flange of said first mentioned sleeve and in threaded engagement with said housing.

2. A coffee mill, comprising a burr housing, a stationary burr therein, a drive shaft, a sleeve slidably keyed to said drive shaft, a rotary burr carried by the forward end of said sleeve, a second sleeve having a flanged forward end keyed to said housing, surrounding said first mentioned sleeve and movable lengthwise of the shaft, a third sleeve surrounding said second sleeve, having a hand wheel at its outer end and its inner end engaging the flange of the second sleeve, said third sleeve having a threaded engagement with said housing.

3. A coffee mill comprising a burr housing having a feed opening in one side wall and an aligned opening in the opposite wall, a stationary annular burr within the housing and surrounding the feed opening, a drive shaft projecting into the opening opposite the feed opening, a sleeve slidably keyed to said drive shaft and projecting beyond the inner end thereof, said sleeve having an enlarged end within the housing, a burr fixed to the enlarged end of said sleeve, an adjusting sleeve surrounding said burr carrying sleeve and movable toward and from the enlarged end thereof, means for adjusting said second mentioned sleeve toward and from the enlarged end of the burr carrying sleeve and means for limiting the movement of said adjusting sleeve in both directions.

4. A coffee mill comprising a burr housing, a stationary burr therein, a drive shaft, a sleeve slidably keyed to said drive shaft, said sleeve having an enlarged end within the housing, a burr secured to the enlarged end of said sleeve, a second sleeve surrounding said first mentioned sleeve, movable longitudinally thereof and engageable with the enlarged end of the burr carrying sleeve, a third sleeve having a hand wheel thereon, said third sleeve surrounding said shaft, engaging said longitudinally movable sleeve and having a threaded engagement with said housing.

5. A coffee mill, comprising a burr housing, a stationary burr therein, a drive shaft, a sleeve slidably keyed to said drive shaft, a rotary burr carried by the forward end of said sleeve, a second sleeve having a flanged forward end keyed to said housing, surrounding said first mentioned sleeve and movable lengthwise of the shaft, a third sleeve surrounding said second sleeve, carrying a hand wheel at its outer end and having its inner end in engagement with the flange of the second sleeve, said third sleeve having a threaded engagement with the housing and stop members carried by the said hand wheel and housing for limiting the rotary movement of said third sleeve.

6. A coffee mill comprising a burr housing having parallel side walls, a stationary burr within the housing adjacent one of said walls, the other of said walls being provided with an internally threaded opening, a drive shaft disposed axially of said opening, a rotary burr slidably keyed to said shaft, an adjusting sleeve in threaded engagement within said opening, a hand wheel on the outer end of said sleeve, a spring detent mounted in the housing and engaging said hand wheel for holding said hand wheel in adjusted position, and a lug carried by the hand wheel adapted to engage said detent to limit the rotative movement of the hand wheel.

7. A coffee mill, comprising a burr housing having parallel side walls, a stationary burr fixed to one of said side walls, the other of said walls being provided with an internally threaded opening, a drive shaft disposed axially of said opening, a rotary burr slidingly keyed to said shaft, an adjusting sleeve in threaded engagement with said threaded opening, a hand wheel fixed to the outer end of said sleeve, interengaging stop lugs carried by said hand wheel and housing, and a spring detent interposed between said hand wheel and housing for holding said hand wheel in intermediate adjusted positions, said detent being in the path of movement of the stop lug on the hand wheel.

8. A coffee mill, comprising a burr housing, a stationary burr in said housing, the wall of said housing opposite the grinding face of said stationary burr having an internally threaded opening, a drive shaft disposed axially of said opening, a rotary burr slidably keyed upon said drive shaft, an adjusting sleeve in threaded engagement with said threaded opening, a hand wheel fixed to the outer end of said sleeve, said hand wheel having a stop lug on its inner face, and a series of circumferentially spaced indentations on one side of said stop lug, an outwardly projecting stop lug on said housing, and an outwardly projecting spring detent carried by said housing and spaced from said outwardly projecting stop lug, said lug on the inner face of said hand wheel being engageable with said lug and detent on the housing to limit the rotary movement of said hand wheel and said spring detent being engageable with the indentations in said hand wheel to hold said hand wheel in intermediate adjusted positions.

9. A coffee mill comprising a burr housing, a burr within the housing and fixed thereto, a drive shaft, a sleeve slidably keyed to the drive shaft, said sleeve having an enlarged end within the housing, a burr fixed to the enlarged end of said sleeve, a nonrotatable sleeve surrounding said first mentioned sleeve and slidably supported in the housing, said nonrotatable sleeve engaging the enlarged end of said first mentioned sleeve, and means for adjusting said nonrotatable sleeve 10. A coffee mill comprising a burr housing having one side wall provided with an axial feed opening and its opposite side wall provided with an outwardly projecting boss disposed axially thereof and havng an interiorly threaded opening, an annular burr fixed to the housing and surrounding the feed opening, a drive shaft extending into the threaded opening, a sleeve having an enlarged end within the housing, said sleeve being slidably keyed to the drive shaft, a burr carried by the enlarged end of the sleeve, a nonrotatable sleeve surrounding said first mentioned sleeve, said nonrotatable sleeve having an enlarged inner end slidably keyed to the housing and engageable with the enlarged end of said first mentioned sleeve, and an adjusting sleeve surrounding the nonrotatable sleeve and engageable with the enlarged end thereof, said adjusting sleeve being in threaded engagement with the internal threads of the opening.

In testimony whereof, I hereunto affix my signature.

WILLIS E. KIDNEY.